United States Patent
Micken et al.

(10) Patent No.: US 10,151,414 B2
(45) Date of Patent: Dec. 11, 2018

(54) INTAKE MANIFOLD

(71) Applicant: Dixon Valve & Coupling Company Inc., Chestertown, MD (US)

(72) Inventors: Matthew Micken, Millington, MD (US); James Shifrin, Chestertown, MD (US); Edward Sander, Wilmington, DE (US)

(73) Assignee: Dixon Valve & Coupling Company, Chestertown, MA (US)

( * ) Notice: Subject to any disclaimer, the term of this patent is extended or adjusted under 35 U.S.C. 154(b) by 384 days.

(21) Appl. No.: 15/018,652

(22) Filed: Feb. 8, 2016

(65) Prior Publication Data

US 2016/0230510 A1    Aug. 11, 2016

Related U.S. Application Data

(60) Provisional application No. 62/113,750, filed on Feb. 9, 2015.

(51) Int. Cl.
| | |
|---|---|
| *F16L 41/03* | (2006.01) |
| *F16L 41/02* | (2006.01) |
| *F04B 53/16* | (2006.01) |
| *F04B 53/22* | (2006.01) |

(52) U.S. Cl.
CPC .............. *F16L 41/02* (2013.01); *F04B 53/16* (2013.01); *F04B 53/22* (2013.01); *F16L 41/03* (2013.01)

(58) Field of Classification Search
CPC .................................. F16L 41/03; F04B 53/16
USPC ........................................ 285/125.1; 60/323
See application file for complete search history.

(56) References Cited

U.S. PATENT DOCUMENTS

| | | | |
|---|---|---|---|
| 1,321,952 A | 11/1919 | Tice | |
| 4,184,329 A * | 1/1980 | Ruesch | F01N 13/1805 60/322 |
| 5,636,515 A | 6/1997 | Matsumoto et al. | |
| 5,692,373 A | 12/1997 | Atmur et al. | |
| 6,082,104 A | 7/2000 | Hyakutake et al. | |
| 6,343,417 B1 | 2/2002 | Bonny et al. | |
| 6,629,828 B1 * | 10/2003 | Johansson | F04B 53/16 285/368 |
| D700,555 S | 3/2014 | Glaeser | |
| D700,556 S | 3/2014 | Glaeser | |
| D700,558 S | 3/2014 | Glaeser | |
| D700,559 S | 3/2014 | Glaeser | |
| D700,560 S | 3/2014 | Glaeser | |
| D700,561 S | 3/2014 | Glaeser | |
| 8,985,087 B2 | 3/2015 | Matsuzaki et al. | |
| 9,441,776 B2 * | 9/2016 | Byrne | F04B 53/001 |
| D779,559 S | 2/2017 | Micken et al. | |
| 9,745,968 B2 * | 8/2017 | Kotapish | F04B 53/16 |
| 2005/0072143 A1 | 4/2005 | Diez | |
| 2005/0279313 A1 | 12/2005 | Boyes | |
| 2006/0236687 A1 | 10/2006 | Ruehle | |
| 2009/0217915 A1 | 9/2009 | Heald et al. | |
| 2009/0293831 A1 | 12/2009 | Harada | |

(Continued)

*Primary Examiner* — David Bochna
(74) *Attorney, Agent, or Firm* — Howson & Howson LLP

(57) ABSTRACT

An intake manifold provided as an integral one-piece manifold body. The manifold has a base plate with a series of spaced apart discharge ports and an elongate tapered pipe portion formed integrally with the base plate, having an inlet, and having inner tapered walls for directing flow through the manifold body from the inlet through the discharge ports of the base plate.

15 Claims, 4 Drawing Sheets

(56) References Cited

U.S. PATENT DOCUMENTS

| | | |
|---|---|---|
| 2010/0018192 A1 | 1/2010 | Suschik |
| 2011/0039461 A1 | 2/2011 | White |
| 2013/0071256 A1* | 3/2013 | Kent .................. F04B 49/10 417/1 |
| 2014/0041372 A1 | 2/2014 | Cha et al. |
| 2014/0130887 A1* | 5/2014 | Byrne .................. F16L 41/02 137/15.01 |
| 2014/0165544 A1 | 6/2014 | Geminn et al. |
| 2016/0369926 A1* | 12/2016 | Shuck .................. F04B 53/16 |

* cited by examiner

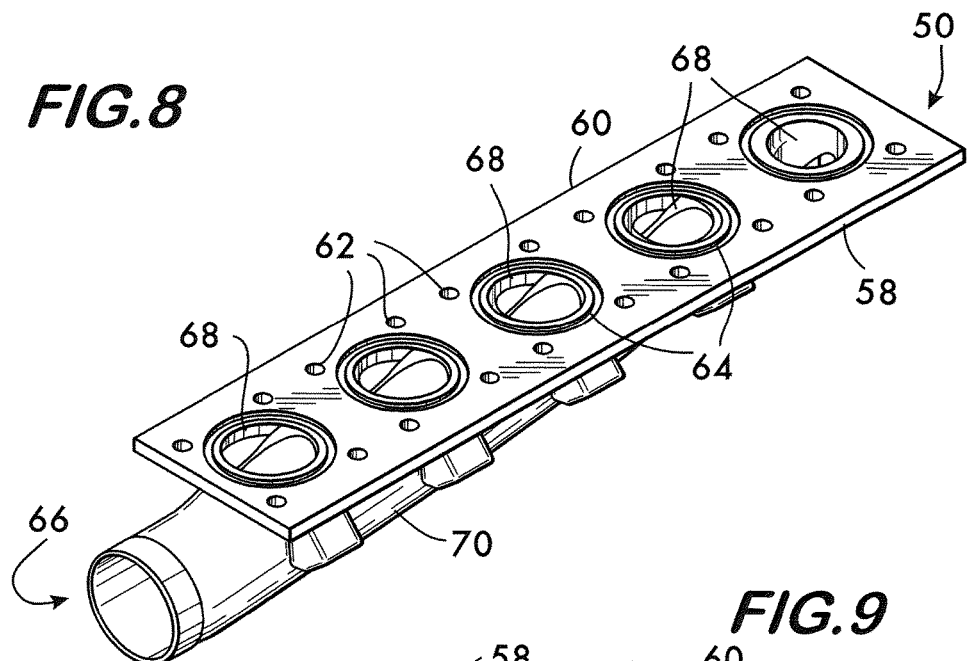
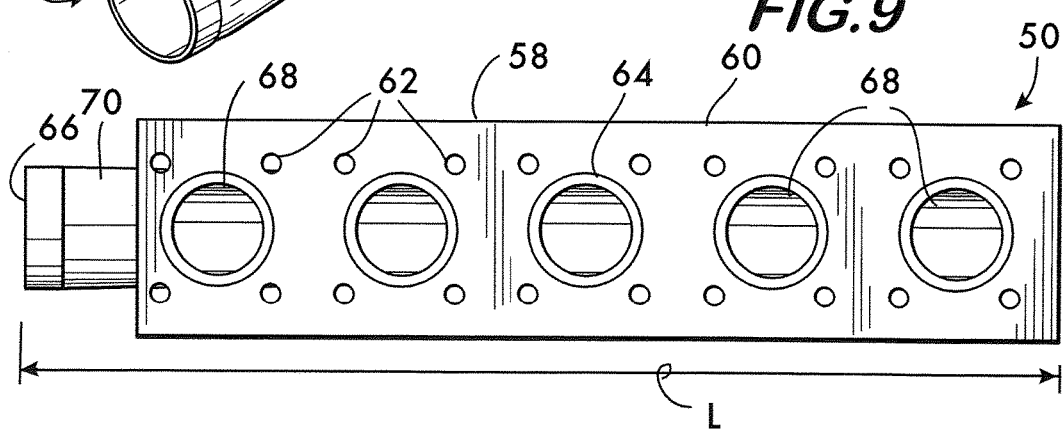
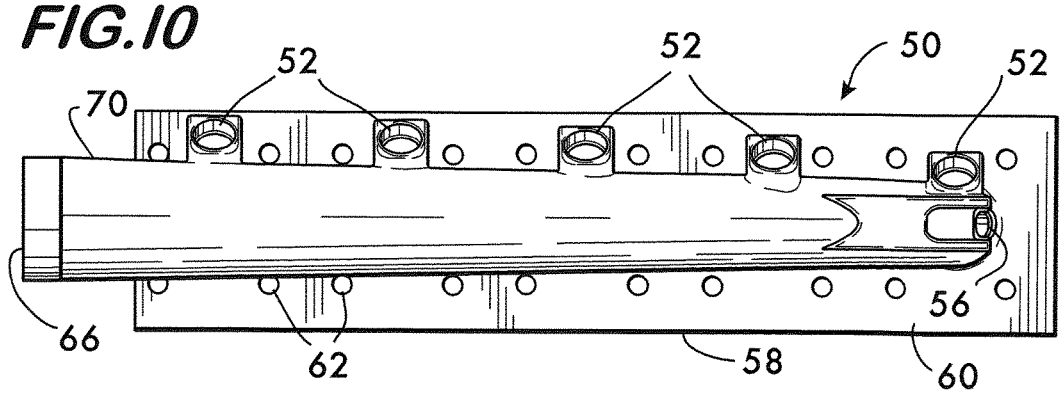

INTAKE MANIFOLD

CROSS REFERENCE TO RELATED APPLICATIONS

This application claims the benefit under 35 USC § 119(e) of U.S. Provisional Patent Application No. 62/113,750, filed Feb. 9, 2015.

BACKGROUND

This disclosure relates to a manifold that may be used with pumps, such as pumps used in hydraulic fracturing (i.e. frac pumps).

Hydraulic fracturing (i.e., fraccing) is a well-stimulation technique in which rock is fractured by hydraulically pressurized liquid or slurry made of water, sand, particulate matter, chemicals or the like. Typically, water and sand make up about 98 to 99.5 percent of the slurry used in hydraulic fracturing. Hydraulic fracturing is performed after a drilled hole is completed and uses the slurry to create or restore small fractures in a formation in order to stimulate production from new or existing oil and gas wells. Thus, the high-pressure slurry injected into a wellbore creates cracks in deep-rock formations through which natural gas, petroleum, and brine flow more freely. Accordingly, as a result of fraccing, paths are formed that increase the rate at which fluids can be produced from the reservoir formations.

Pumps are used to generate the high pressure, such as 15,000 to 17,000 psi, at which the slurry is injected into a wellbore. Intake manifolds are connected to the pumps for receiving a mixture or slurry and feeding the slurry to the pump at a pressure such as 100 to 150 psi.

A conventional intake manifold is formed as a result of welding together several standard pipe fittings mated to a separately machined base plate. Such conventional manifolds have been known to develop leaks through welds and generally produce poor flow patterns. In addition, conventional intake manifolds do not provide a means for removing debris collected within the manifold without having to completely remove the manifold from the pump.

BRIEF DESCRIPTION OF THE DRAWINGS

FIG. 8 is a perspective view of an intake manifold having five discharge ports in accordance with an embodiment.

FIG. 9 is a plan view of the intake manifold of FIG. 8.

FIG. 10 is a bottom view of the intake manifold of FIG. 8.

DETAILED DESCRIPTION

FIGS. 1-7 and 8-14 illustrate three-port and five-port intake manifolds 10 and 50, respectively, that may be connected to the low pressure side of a hydraulic fracturing pump (frac pump) for feeding slurry to the frac pump (not shown). Thus, each of the manifolds, 10 and 50, may be sized to fit a three-port or a five-port fluid end of a frac pump.

Unlike conventional intake manifolds that are welded together from several separate standard pipe fittings, the manifolds, 10 and 50, are each formed as a one-piece machined casting of metal, such as ductile iron or stainless steel. Accordingly, the intake manifolds, 10 and 50, are without any threaded connections and welds conventionally used to connect separately produced parts of a manifold. Additionally, the flow paths provided by the intake manifolds, 10 and 50, eliminate problems such as sand drop out and cavitation typically experienced with conventional intake manifolds.

Figure 4:
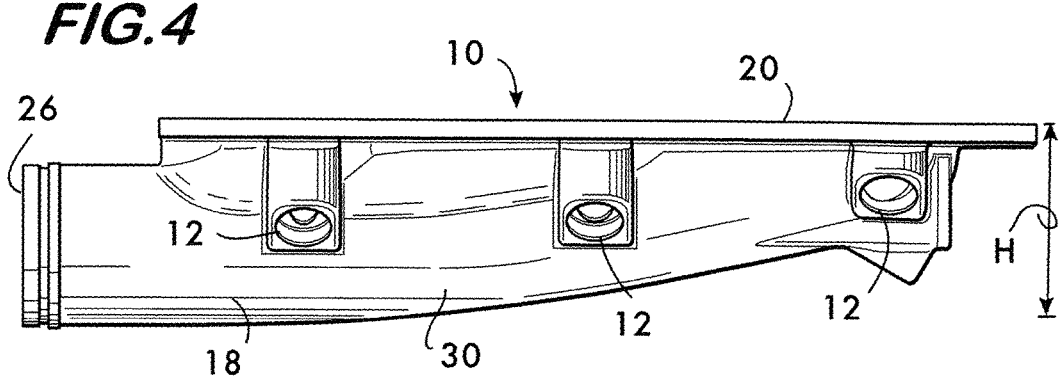
FIG. 4 is a right side elevational view of the intake manifold of FIG. 1.
Figure 7:
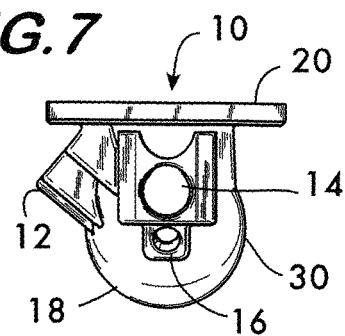
FIG. 7 is a rear end view of the intake manifold of FIG. 1.
Figure 11:
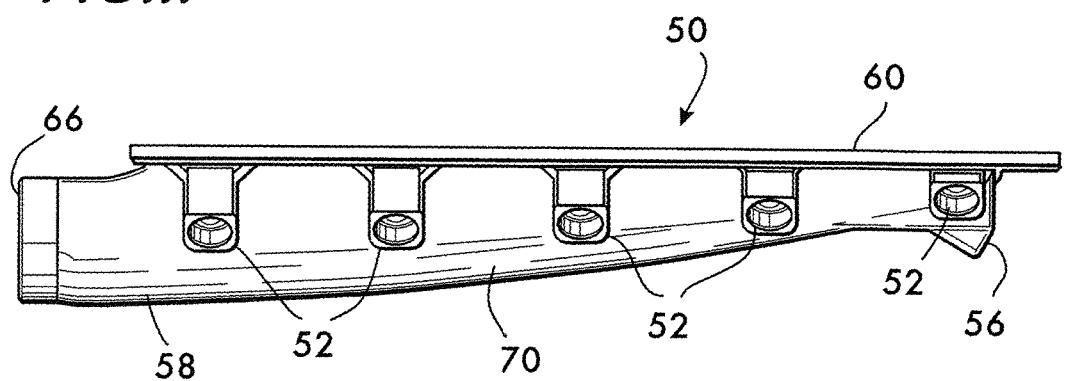
FIG. 11 is a right side elevational view of the intake manifold of FIG. 8.
Figure 12:
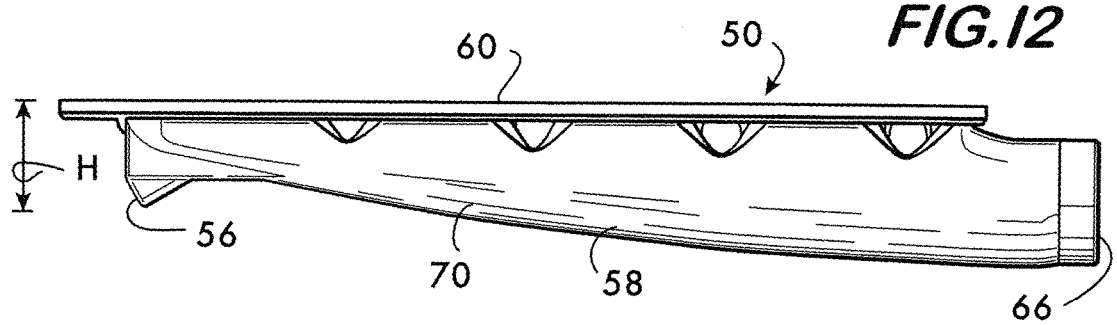
FIG. 12 is a left side elevational view of the intake manifold of FIG. 8.
Figure 13:
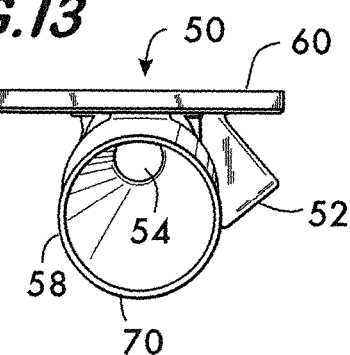
FIG. 13 is a front end view of the intake manifold of FIG. 8.
Figure 14:
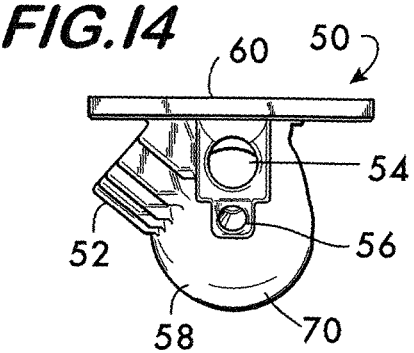
FIG. 14 is a rear end view of the intake manifold of FIG. 8.

As best shown in FIGS. 4 and 11, the intake manifolds, 10 and 50, include a series of normally-sealed closed angled side clean out ports, 12 and 52, respectively, that, when unsealed, permit visibility into each intake cylinder of the attached pump. Further, as best shown in FIGS. 7 and 14, the intake manifolds, 10 and 50, include end ports, 14 and 54, that are sealed closed during normal operation and that can be opened and accessed for use in back flushing the intake manifold to clear any unwanted collected debris. The intake manifolds also include end ports, 16 and 56, that may be sealed closed or permit insertion of a pressure sensor or the like to monitor conditions within the manifold at the low pressure feed side of the frac pump during normal operations.

The overall height "H" of the manifolds, 10 and 50, has been reduced in comparison to conventional manifolds for purposes of permitting direct attachment to a fluid end of the pump without removal or raising of the fluid end up of the pump off a trailer or similar support structure.

Referring specifically to FIGS. 1-7, the manifold 10 is provided in the form of a manifold body 18 manufactured or cast as a single piece without the need of thread connections, welds, or like connections. The manifold body 18 has a flange/base plate 20 formed with bolt holes 22 used for attaching the manifold 10 to fluid inlet end of a frac pump. The flange/base plate 20 has a series (three) of O-ring grooves 24 for receiving resilient O-rings (not shown) that provide sealing of mating surfaces of the manifold 10 to the frac pump. The manifold body 18 has an inlet port 26 that may be provided, for instance, as a six inch nominal diameter pipe that is configured with male National Pipe Thread (NPT), grooved (Victaulic/Grinnell style) groove or hammer union connections, or the like. Of course, other sizes and connection types may be used.

The flange/base plate 20 extends generally perpendicular to the inlet port 26 such that the slurry generally flows into the manifold 10 in a first direction generally parallel to the base plate 20 and flows out of the manifold through discharge ports 28 defined by and through the flange/base plate 20 in a second direction generally offset by about 90° to the first direction of flow through the inlet 26. For instance, flow into the manifold 10 may be along a horizontal direction and flow out of the manifold through the discharge ports may be along a vertical direction. Of course, this may be varied, as needed and as required by the pump.

Figure 1:
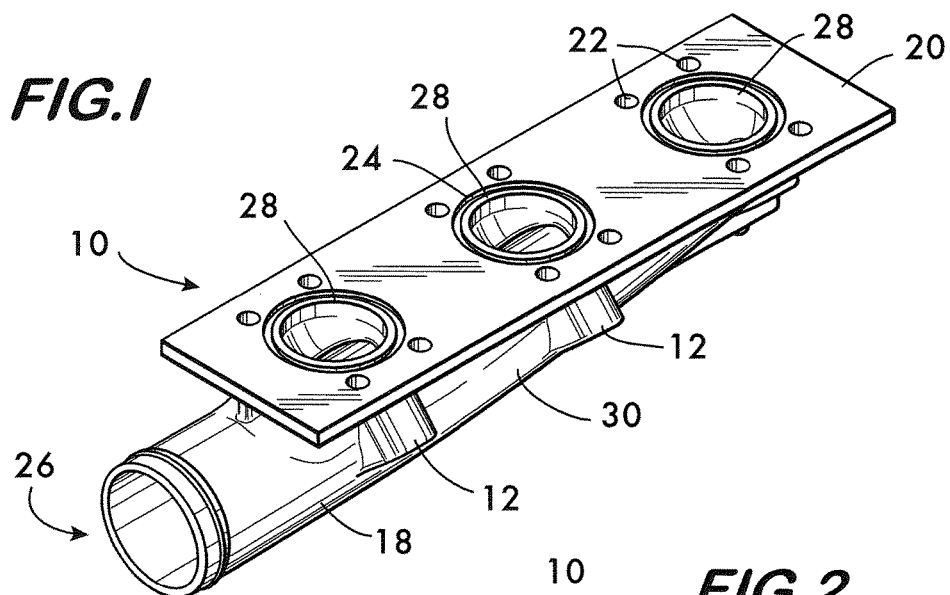
FIG. 1 is a perspective view of an intake manifold having three discharge ports in accordance with an embodiment.
Figure 2:
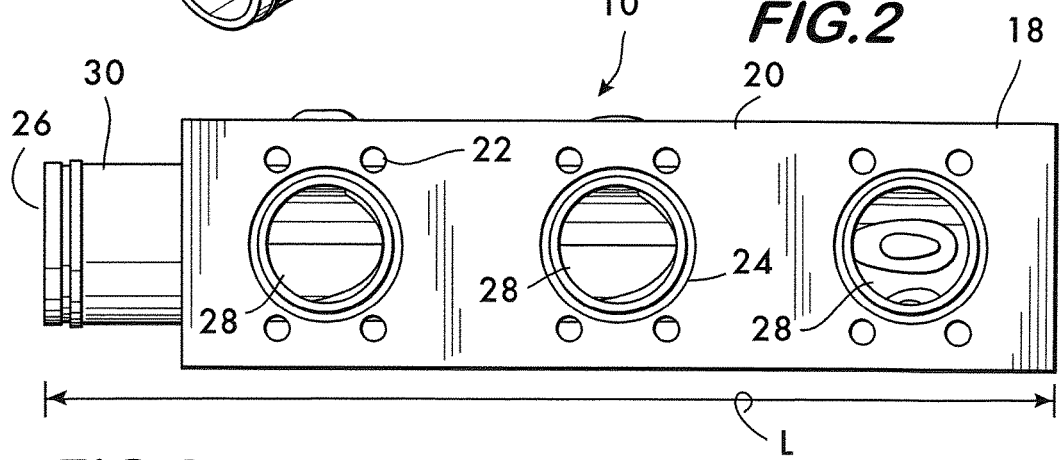
FIG. 2 is a plan view of the intake manifold of FIG. 1.
Figure 3:
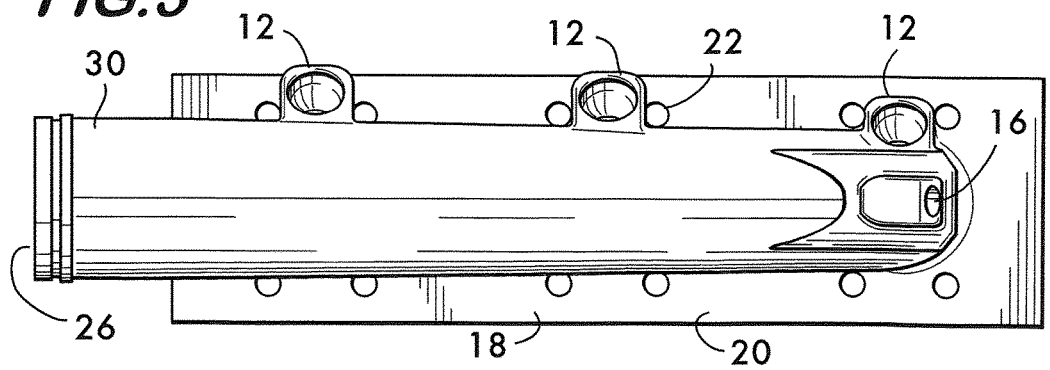
FIG. 3 is a bottom view of the intake manifold of FIG. 1.
Figure 5:
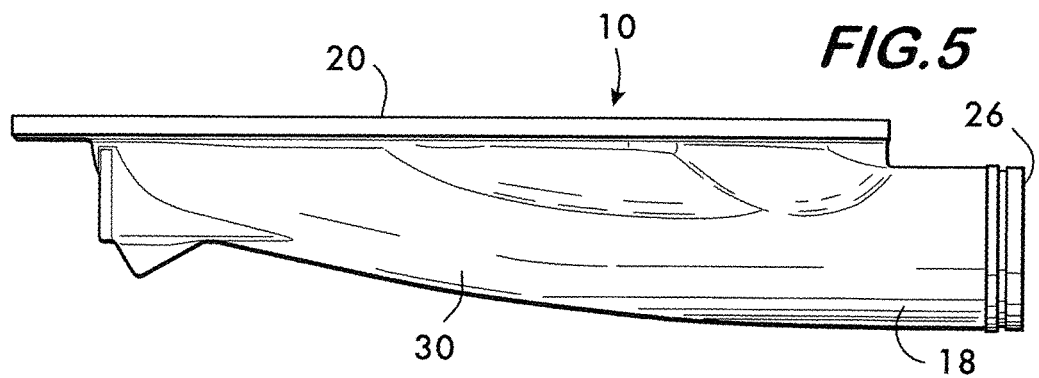
FIG. 5 is a left side elevational view of the intake manifold of FIG. 1.
Figure 6:
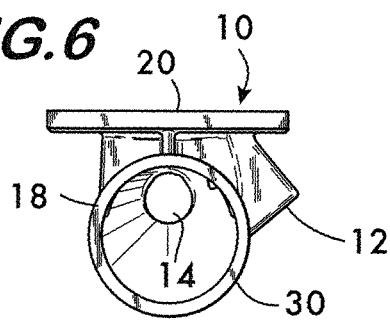
FIG. 6 is a front end view of the intake manifold of FIG. 1.

The manifold 10 is produced and designed to provide even fluid/slurry flow from the inlet port 26 to each discharge port 28 and to eliminate dead flow spots that may allow solids, such as sand and other particulate matter, to drop out of the slurry due to gravity or the like. Each discharge port 28 of the manifold 10 may match or substantially match the adjacent inlet port of the frac pump. As best shown in FIGS. 3-5, the manifold body 18 includes an elongate tubular section 30 that smoothly tapers or narrows from the inlet port 26 to the opposite end of the manifold body 18 and that is continuously connected to the flange/base plate 20 to an extent needed to span and surround all three discharge ports 28. As shown in FIG. 6, the elongate tubular portion 30 is hollow continuously between the inlet 26 and closed opposite end and has continuously smooth tapered inner wall surfaces that extend therebetween and are without uneven surfaces formed by welds or the like connections.

The manifold 10 also includes three side ports 12 that may be provided, for instance, as two inch female NPT side ports angled to permit direct visibility to each intake port of the frac pump and each discharge port 28 of the manifold. Here, the side ports 12 are angled relative to the flange/base plate 20 and are aligned with the discharge ports 28 for purposes of facilitating clean out and inspection of the manifold 10 and fluid ports of the frac pump. The angle may be, for instance, 30° to 60° relative to the flange/base plate 20, such as 45°.

The end port 14 may be provided, for instance, as a two inch female NPT connection and may be used for back flushing or other purpose. The end port 16 may be provided, for instance, as a one inch female NPT connection and may be used for insertion of a pressure probe or for other purposes. The end port 14 may extend parallel to the flange/base plate 20, and the end port 16 may extend at an angle to the flange/base plate 20 at an angle similar to that of the side ports 12.

Merely for purposes of example, the flange/base plate 20 of the intake manifold 10 may have dimensions of 36 inches by 11.5 inches, and the manifold 10 may have an overall length "L" of 42 inches and an overall height "H" of 8.5 inches. The manifold 10 may be made of iron and weight approximately 170 pounds and may be designed to handle about 300 gallons per minute (gpm) of flow at about 100 to 150 pounds per square inch (psi). Of course, the dimensions, weight, and material of the manifold 10 and its flow and pressure capabilities may be altered, as needed.

Referring specifically to FIGS. 8-14, the manifold 50 is provided in the form of a manifold body 58 manufactured or cast as a single piece without the need of thread connections, welds, or like connections. The manifold body 58 has a flange/base plate 60 formed with bolt holes 62 used for attaching the manifold 50 to fluid inlet end of a frac pump. The flange/base plate 60 has a series (three) of O-ring grooves 64 for receiving resilient O-rings (not shown) that provide sealing of mating surfaces of the manifold 50 to the frac pump. The manifold body 58 has an inlet port 66 that may be provided, for instance, as a six inch nominal diameter pipe that is configured with male National Pipe Thread (NPT), grooved (Victaulic/Grinnell style) groove or hammer union connections, or the like. Of course, other sizes and connection types may be used.

The flange/base plate 60 extends generally perpendicular to the inlet port 66 such that the slurry generally flows into the manifold 50 in a first direction parallel to the base plate 60 and flows out of the manifold through discharge ports 68 on the flange/base plate 60 in a second direction offset from the first direction by about 90°. For instance, flow into the manifold 50 may be along the horizontal and flow out of the manifold through the discharge ports may be along the vertical. Of course, this may be varied, as needed and as required by the pump.

The manifold 50 is produced and designed to provide even fluid/slurry flow from the inlet port 66 to each discharge port 68 and to eliminate dead flow spots that may allow solids, such as sand and other particulate matter, to drop out of the slurry due to gravity or the like. Each discharge port 68 of the manifold 50 may match or substantially match the adjacent inlet port of the frac pump. As best shown in FIGS. 3-5, the manifold body 58 includes a elongate pipe section 70 that smoothly tapers or narrows from the inlet port 66 to the opposite end of the manifold body 58 and that is continuously connected to the flange/base plate 60 to an extent needed to span and surround all five of the discharge ports 68.

The manifold 50 also includes five side ports 52 that may be provided, for instance, as two inch female NPT side ports angled to permit direct visibility to each intake port of the frac pump and each discharge port 68 of the manifold. Here, the side ports 52 are angled relative to the flange/base plate 60 and are aligned with the discharge ports 68 for purposes of facilitating clean out and inspection of the manifold 50 and fluid ports of the frac pump. The angle may be, for instance, 30° to 60° relative to the flange/base plate 60, such as 45°.

The end port 54 may be provided, for instance, as a two inch female NPT connection and may be used for back flushing or other purpose. The end port 56 may be provided, for instance, as a one inch female NPT connection and may be used for insertion of a pressure probe or for other purposes. The end port 54 may extend parallel to the flange/base plate 60, and the end port 56 may extend at an angle to the flange/base plate 60 at an angle similar to that of the side ports 52.

Merely for purposes of example, the flange/base plate 60 of the intake manifold 50 may have dimensions of 50 inches by 11.5 inches, and the manifold 10 may have an overall length "L" of 56 inches and an overall height "H" of 8.5 inches. The manifold 50 may be made of iron and weight approximately 225 pounds and may be designed to handle about 300 gallons per minute (gpm) of flow at about 100 to 150 pounds per square inch (psi). Of course, the dimensions, weight, and material of the manifold 50 and its flow and pressure capabilities may be altered, as needed.

Accordingly, the intake manifolds, 10 and 50, are each manufactured as one integral piece such as produced by a casting or within a mold. Thus, each may be made of an iron or stainless steel casting or a casting of other metal or like material. The one-piece nature of the manifolds, 10 and 50, as manufactured eliminates welds and threads which ultimately may leak, provide problems during service, and effect flow patterns. Further, the one-piece cast manifold enables the inside walls of the manifold to be smooth and tapered without any bulges, projections, disruptions, etc. that would disturb smooth flow of the slurry through the manifold. For instance, see FIGS. 6 and 13.

Accordingly, the streamlined tapered design of the manifolds, 10 and 50, provides smooth flow of slurry therethrough. In addition, the taper functions to accelerate the slurry as the slurry moves through the manifold. This, in turn, prevents solid matter such as sand and other particulates suspended in the slurry from dropping out and collecting in the manifold and further provides even and uniform flow to each of the multiple discharge ports provided by the manifold. The side ports of the manifolds are provided at an angle that readily permits direct visibility to each discharge port of the manifold and intake port of the frac pump to facilitate clean out and inspection thereof without the need to disassemble the manifold from the pump. The end ports of the manifolds enable back flushing, pressure probe insertion, and the like without disassembling the manifold from the pump.

The foregoing description and specific embodiments are merely illustrative of the principles thereof, and various modifications and additions may be made to the apparatus by those skilled in the art, without departing from the spirit and scope of this invention.

We claim:

1. An intake manifold, comprising an integral one-piece manifold body having a base plate with a series of separate spaced-apart discharge ports and an elongate tapered pipe portion extending along a face of the base plate, the elongate tapered pipe portion being hollow along its length, being forming integrally with the base plate, having an inlet at one end thereof, having inner tapered wall surfaces for directing flow through the manifold body from the inlet through the discharge ports of the base plate, having a first end port opposite the inlet enabling back flushing of the manifold body, and having a second end port opposite the inlet and angled relative to the base plate enabling insertion of a pressure probe.

2. The intake manifold according to claim 1, wherein the manifold body is cast as a single integral piece.

3. The intake manifold according to claim 2, wherein the manifold body is a casting of iron or stainless steel.

4. The intake manifold according to claim 1, wherein the manifold body includes a series of spaced-apart side ports extending laterally through the walls of the elongate tapered pipe portion, each of the side ports being angled relative to the base plate and being adjacent one of the discharge ports to enable visual inspection of the adjacent discharge port.

5. The intake manifold according to claim 1, wherein the elongate tapered pipe portion contacts and extends integrally from the base plate continuously for a length sufficient to entirely span and surround the series of discharge ports.

6. The intake manifold according to claim 1, wherein the series of discharge ports includes three or five uniformly spaced and sized ports.

7. The intake manifold according to claim 1, wherein the elongate tapered pipe portion is reduced in size from the inlet port to an opposite end of the elongate tapered pipe portion.

8. An intake manifold, comprising:
an integral one-piece manifold body, as manufactured, having a base plate with a series of spaced apart discharge ports and an elongate pipe portion;
the elongate pipe portion extending along and being integral with one side of the base plate, having an inlet, and opening into each of the discharge ports such that that the elongate pipe portion defines a flow path from the inlet through the discharge ports of the base plate;
the elongate pipe portion having a first end port opposite the inlet enabling back flushing of the manifold body and a second end port opposite the inlet and angled relative to the base plate enabling insertion of a pressure probe; and
the elongate pipe portion being tapered along its length such that it reduces in size from the inlet to an opposite end of the elongate pipe portion; and
the manifold body being a single integral casting of iron or stainless steel.

9. The intake manifold according to claim 8, wherein the manifold body includes a series of spaced apart side ports extending laterally into the elongate pipe portion, each of the side ports being angled relative to the base plate and adjacent one of the discharge ports to enable visual inspection of the adjacent discharge port.

10. The intake manifold according to claim 8, wherein the elongate pipe portion continuously contacts and extends integrally from the base plate for a length sufficient to span and surround the series of discharge ports.

11. The intake manifold according to claim 10, wherein the series of discharge ports includes three or five uniformly spaced and sized ports.

12. An assembly including an intake manifold and a pump, comprising:
an integral one-piece intake manifold body, as manufactured, having a base plate with a series of spaced apart discharge ports and an elongate pipe portion, the manifold body being secured to a pump such that each of the discharge ports of the manifold body are aligned with a fluid entry port of the pump;
the elongate pipe portion of the manifold body extending along and being integral with one side of the base plate, having an inlet, and opening into each of the discharge ports such that that the elongate pipe portion defines a flow path from the inlet through the discharge ports of the base plate and into the pump;
the elongate pipe portion of the manifold body having a first end port opposite the inlet enabling back flushing of the manifold body and a second end port opposite the inlet and angled relative to the base plate enabling insertion of a pressure probe; and
the elongate pipe portion being tapered along its length such that it reduces in size from the inlet to an opposite end of the elongate pipe portion.

13. The assembly according to claim 12, wherein the manifold body is a single integral casting of iron or stainless steel.

14. The assembly according to claim 13, wherein the manifold body includes a series of spaced apart side ports extending laterally into the elongate pipe portion, each of the side ports being angled relative to the base plate and adjacent one of the discharge ports to enable visual inspection of the adjacent discharge port without disassembling the inlet manifold from the pump.

15. The assembly according to claim 12, wherein the series of discharge ports includes three or five uniformly spaced and sized ports, and wherein the elongate pipe portion continuously contacts and extends integrally from the base plate for a length sufficient to span and surround the series of discharge ports.

* * * * *